(12) United States Patent
Fujita et al.

(10) Patent No.: US 6,291,791 B1
(45) Date of Patent: Sep. 18, 2001

(54) SWITCH FOR POWER SUPPLY CIRCUIT OF ELECTRIC DISCHARGE MACHINE

(75) Inventors: Takeo Fujita, Fukui (JP); Hidehito Hori, Geyland (SG)

(73) Assignee: Sodick Co., Ltd., Yokohama (JP)

( * ) Notice: Subject to any disclaimer, the term of this patent is extended or adjusted under 35 U.S.C. 154(b) by 0 days.

(21) Appl. No.: 09/385,461

(22) Filed: Aug. 30, 1999

(30) Foreign Application Priority Data

Aug. 28, 1998 (JP) .................................................. 10-243281

(51) Int. Cl.⁷ ............................. B23H 1/02; H01H 35/38
(52) U.S. Cl. ...................................... 219/69.13; 200/82 R
(58) Field of Search .............................. 200/83 N, 82 R, 200/82 B; 219/69.13, 69.18

(56) References Cited

U.S. PATENT DOCUMENTS

| | | | |
|---|---|---|---|
| 3,941,957 | * 3/1976 | Tilman | 200/82 R |
| 5,315,088 | 5/1994 | Yamada et al. | 219/69.12 |
| 5,750,951 | 5/1998 | Kaneko et al. | 219/69.18 |

FOREIGN PATENT DOCUMENTS 6-5171 * 1/1994 (JP) ..................................... 200/82 R

* cited by examiner

Primary Examiner—Geoffrey S. Evans
(74) Attorney, Agent, or Firm—McDermott, Will & Emery; Paul Devinsky (57) ABSTRACT

A switch is disclosed for use in a power supply circuit for supplying electric discharge power between a tool electrode and a workpiece. It includes, a movable contact (12) having a piston (12A) and a piston rod (12B) attached to a bottom surface of the piston; a case (11) having a cylindrical hole (11A) enabling reciprocal movement of the piston; a first fixed contact (19) fitted into the case in a water tight fashion and having a hole (19A) to enable the piston rod; a second fixed contact (14) water-tightly fitted into the case in a water tight fashion and having a planar surface extending parallel to and opposite to the top planar surface of the piston; a first terminal (C) attached to the first fixed contact and at least partially exposed to the outside of the case; a second terminal (T) attached to the second fixed contact and at least partially exposed to the outside of the case; and, a driver (15) for moving the movable contact to change connection between the movable contact and the second fixed contact.

8 Claims, 8 Drawing Sheets

(PRIOR ART)

SWITCH FOR POWER SUPPLY CIRCUIT OF ELECTRIC DISCHARGE MACHINE

FIELD OF THE INVENTION

The present invention relates to a switch that can be used within electric discharge machining fluid for changing the connection of a power supply circuit for supplying electric discharge machining power between a tool electrode and a workpiece.

BACKGROUND OF THE INVENTION

An electric discharge machine generally comprises a mechanical section, carrying a member for supporting a workpiece and mechanical components, and a power supply unit that by necessity must be positioned a physical distance away from the mechanical section. A train of controlled power pulses are produced in this power supply unit and applied to a gap between the tool electrode and the workpiece. As the inductance of a cable electrically connecting the power supply unit and the gap is large, the waveform of electrical current pulse generated in the gap suffers from increased distortion, thereby causing energy loss.

U.S. Pat. No. 5,750,951 discloses a transformer, for converting high frequency pulses transmitted from a power supply unit into high frequency alternating current, being provided as close as possible to the gap. The transformer disclosed in this patent comprises a ferrite ring core, a primary winding connected to a d.c. power source, and a secondary winding connected to the primary winding connecting a tool electrode to a workpiece. A case housing the transformer also houses a plurality of switches for connecting and disconnecting the transformer to and from a power supply circuit. When high frequency d.c. pulses are supplied to the gap, the transformer is disconnected from the power supply circuit, and when high frequency a.c. power is supplied to the gap, the transformer is connected to the power supply circuit. The case can be attached, for example, to a machining tank filled with dielectric fluid, or a work stand to which a workpiece is fixed.

Figure 8:
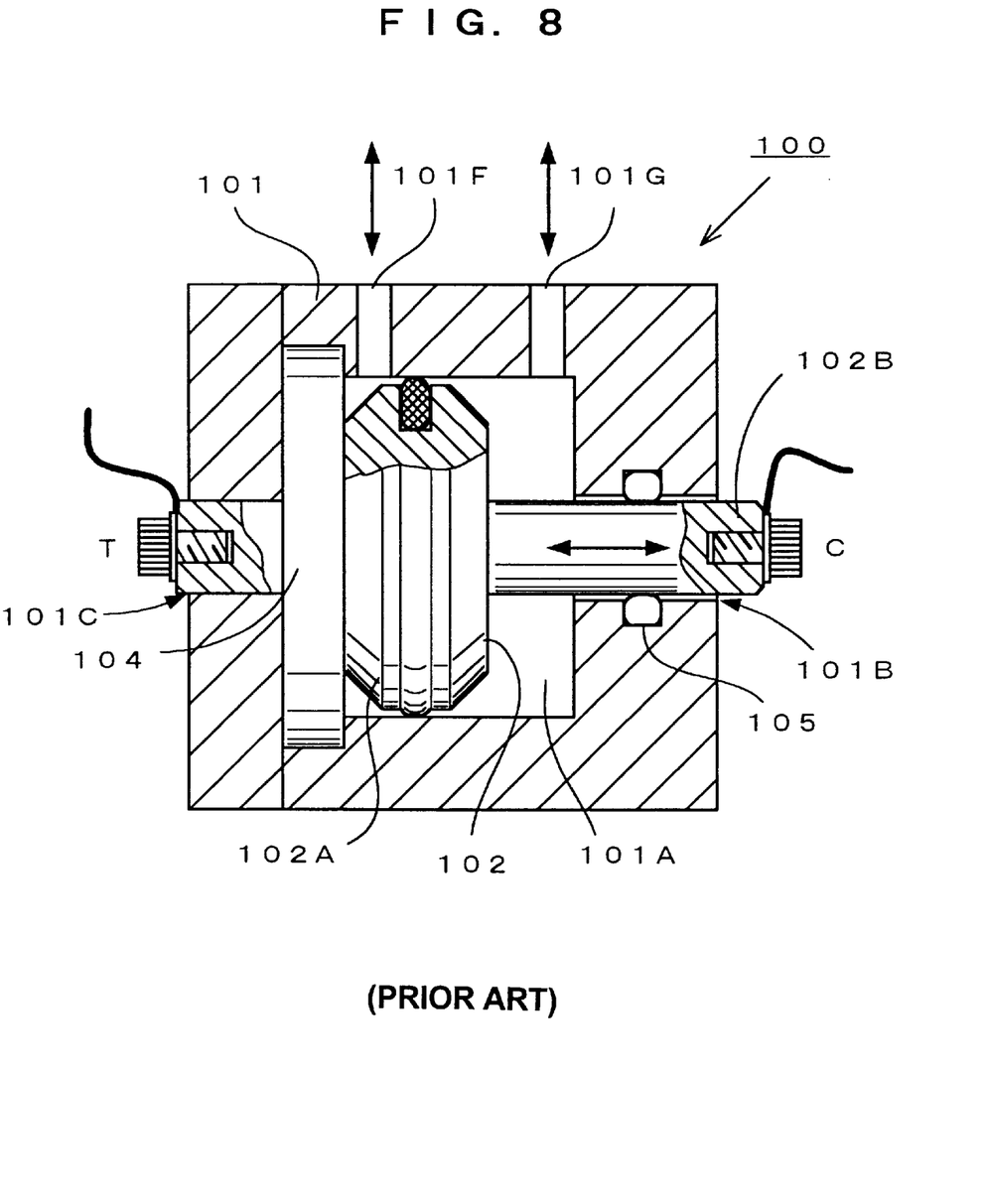
FIG. 8 is a cross sectional drawing illustrating a conventional switch.

FIG. 8 illustrates a conventional mechanical switch for use with a power supply circuit. The switch 100 comprises a case 101 formed of an insulating material, and a movable contact 102 and a fixed contact 102A for respectively electrically connecting to a first terminal C and a second terminal T. The movable contact 102 is comprised of a piston 102A and a piston rod 102B extending from a bottom surface of the piston 102A. A cylindrical hole 101A is formed in the case 101, and the piston 102A is provided so as to be capable of reciprocating movement within the case 101 by being guided by walls of the hole 101A. Openings 101B and 101C leading to the hole 101A are respectively formed in opposite side walls of the case 101. The piston rod 102B extends to the outside of the case 101 through an opening 101B in an axial direction of the piston 102A, and the first terminal C is attached to a tip of the piston rod 102B. An O ring type sealing member 105 is provided so that dielectric fluid does not encroach into the inside of the case from a gap between the piston rod 102B and the case 101. The fixed contact 104 is fitted into the case 101 and has a planar surface extending parallel to and opposite to the top planar surface of the piston 102A. Part of the fixed contact 104 extends to the outside of the case 101 water-tightly blocking the opening 101C, and the second terminal T is attached to a tip of the fixed contact 104. Holes 101F and 101G for supplying air for driving the movable contact 102 to the hole 101A are formed in the case 101. If the top surface of the piston 102A is brought into contact with the planar surface of the fixed contact 104 by supplying air from the hole 101G to the hole 101A, the first terminal C and the second terminal T are electrically connected. If the top surface of the piston 102A is taken away from the fixed contact 104 by supplying air from the hole 101F to the hole 101A, the first terminal C and the second terminal T are electrically disconnected.

During machining the switch 100 is immersed in dielectric fluid or dielectric fluid that has splashed out from the machining section is attached to the switch 100. Because of this, electrical current flows between the first and second terminals C and T, and the piston rod 102B is gradually corroded as a result of this electrolytic action. The sealing member 105 will also be damaged as a result of corrosion on the piston rod 102B. Additionally, fine metallic particles generated as a result of electric discharge machining become attached to the piston rod 102B, and these metallic particles may damage the sealing member 105. If the sealing member 105 is damaged in this way, dielectric fluid will encroach into the hole 101A, and the contacts 102 and 104 will be corroded. Also, encroachment of the dielectric fluid increases energy loss due to the occurrence of insulation deficiency of the switch.

SUMMARY OF THE INVENTION

An object of the present invention is to provide a compact switch for a power supply circuit of an electric discharge machine that makes it more difficult for insulation failure to occur.

A further object of the present invention is to provide a power supply circuit of an electric discharge machine that can supply specified high frequency a.c. power to a gap in a stable manner.

Additional objects, advantages and novel features of the invention will be set forth in the description that follows and will become apparent to those skilled in the art upon reading this description or practicing the invention. The objects and advantages of the invention may be realized and attained by practicing the invention as recited in the appended claims.

In order to attain the above objects, a switch of the present invention for changing connection of a power supply circuit for supplying electric discharge power between a tool electrode and a workpiece comprises:

a movable contact (12) having a piston (12A) and a piston rod (12B) attached to a bottom surface of the piston;

a case (11) having a cylindrical hole (11A) enabling reciprocal movement of the piston;

a first fixed contact (19) water-tightly fitted into the case and having a hole (19A) enabling sliding of the piston rod;

a second fixed contact (14) water-tightly fitted into the case and having a planar surface extending parallel to and opposite to the top planar surface of the piston;

a first terminal (C) attached to the first fixed contact and at least partially exposed to the outside of the case;

a second terminal (T) attached to the second fixed contact and at least partially exposed to the outside of the case; and, a driver (15) for moving the movable contact to change connection between the movable contact and the second fixed contact.

BRIEF DESCRIPTION OF THE DRAWINGS

The accompanying drawings, which are incorporated in and form a part of the specification, illustrate an embodiment of the present invention, and together with the description serve to explain the principles of the invention.

PREFERRED EMBODIMENT OF THE INVENTION

Figure 1:
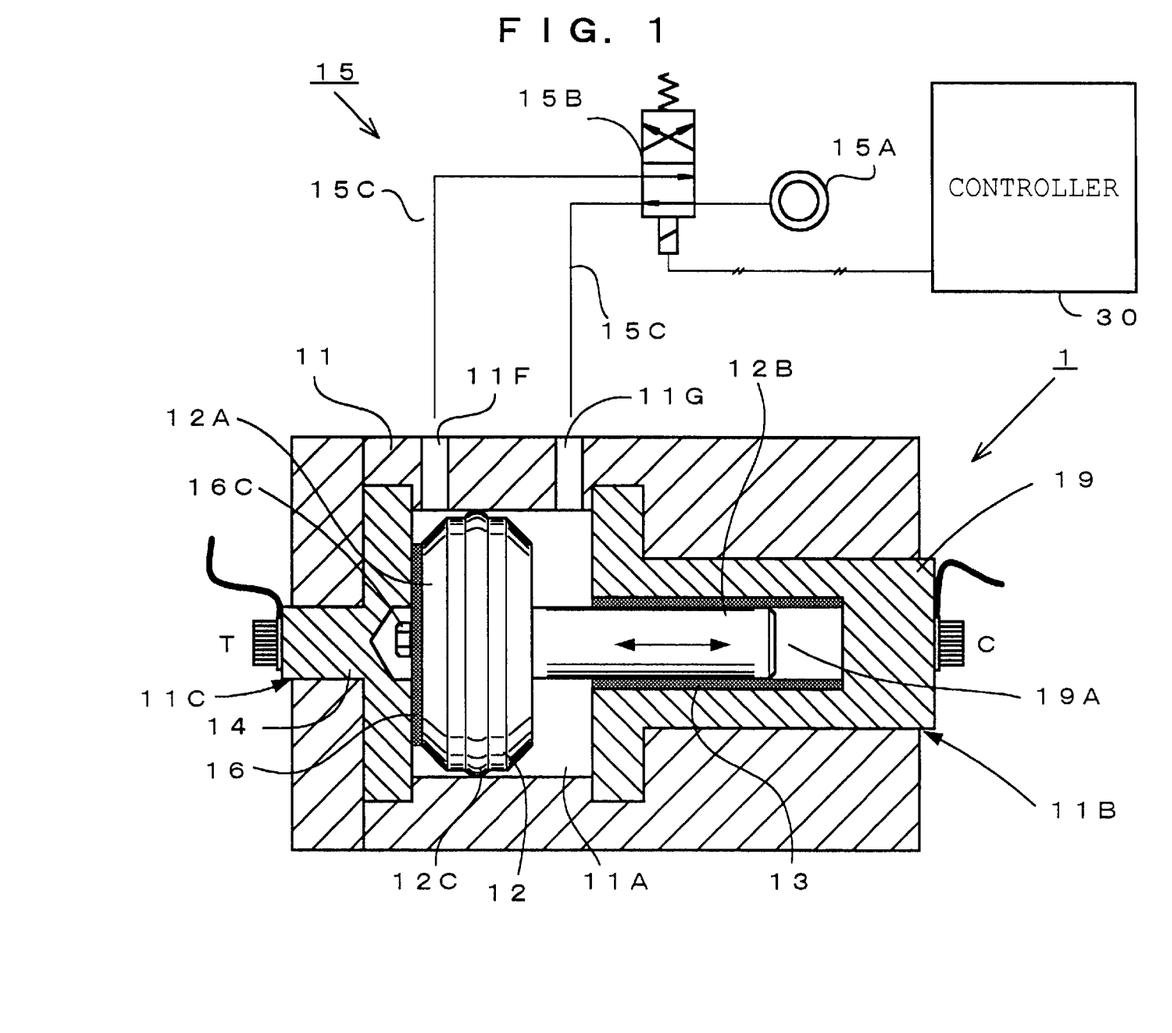
FIG. 1 is a cross sectional drawing illustrating a switch of the present invention.

A first embodiment of a switch for an electric discharge power supply circuit of the present invention will be described with reference to FIG. 1.

The switch 1 comprises a case 11 formed of an insulating material, a movable contact 12 and a first fixed contact 19 electrically connected to a first terminal C, and a second fixed contact 14 electrically connected to a second terminal T. The movable contact 12 is made up of a piston 21A and a piston rod 12B extending from a bottom surface of the piston 12A in an axial direction of the piston 12A. A cylindrical hole 1A is formed in the case 11 and the piston 12A is provided so as to be capable of reciprocating movement within the case 11 guided by walls of the hole 11A. Openings 11B and 11C leading to the hole 11A are formed in side walls of the case 11, at both sides of the cylindrical hole 11A. The first fixed contact 19 is fitted into the case 11 and blocks up the opening 11B in a fluid tight manner. Accordingly, dielectric fluid does not encroach into the case 11, and the movable contact 12 is provided inside the completely water tight case 11.

Figure 2A:
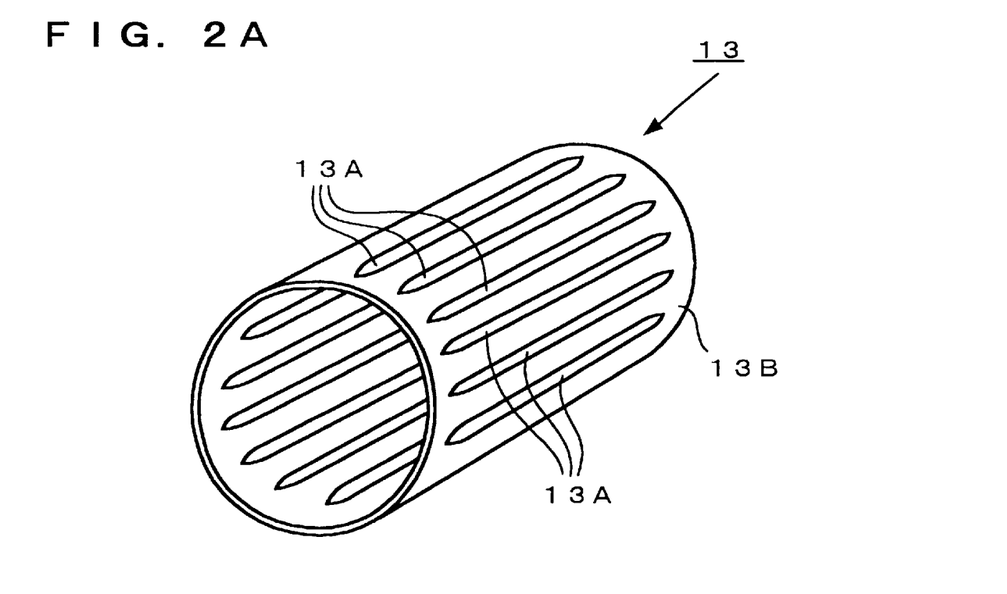
FIG. 2A is a perspective drawing illustrating a cylindrical contact element of the switch of FIG. 1.
Figure 2B:
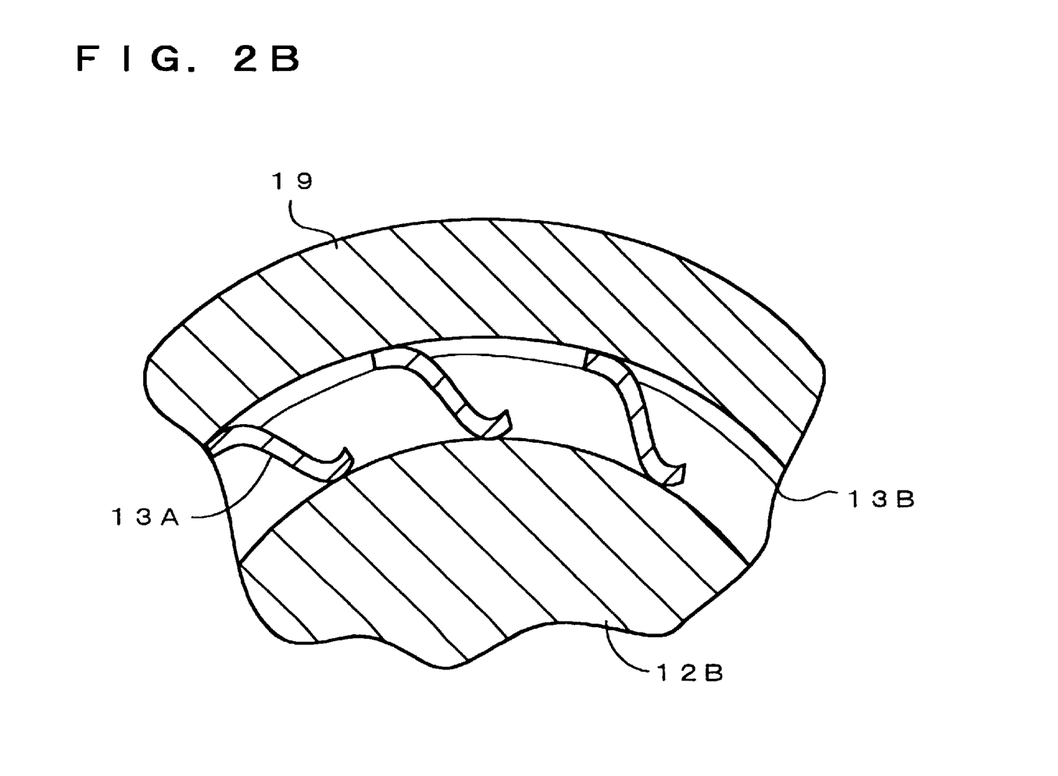
FIG. 2B is a cross sectional drawing illustrating the cylindrical contact element of the switch of FIG. 1.
Figure 3A:
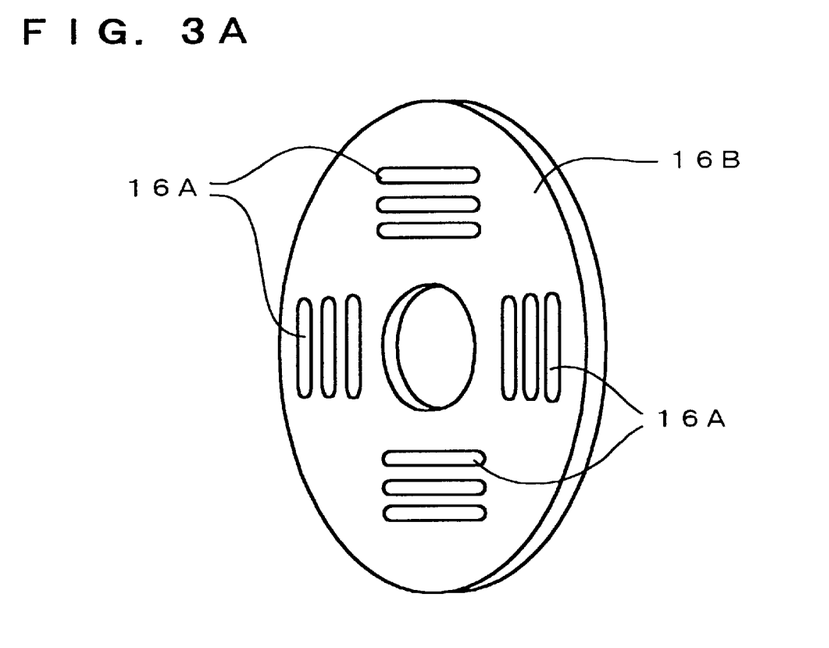
FIG. 3A is a perspective drawing illustrating a disk-shaped contact element of the switch of FIG. 1.
Figure 3B:
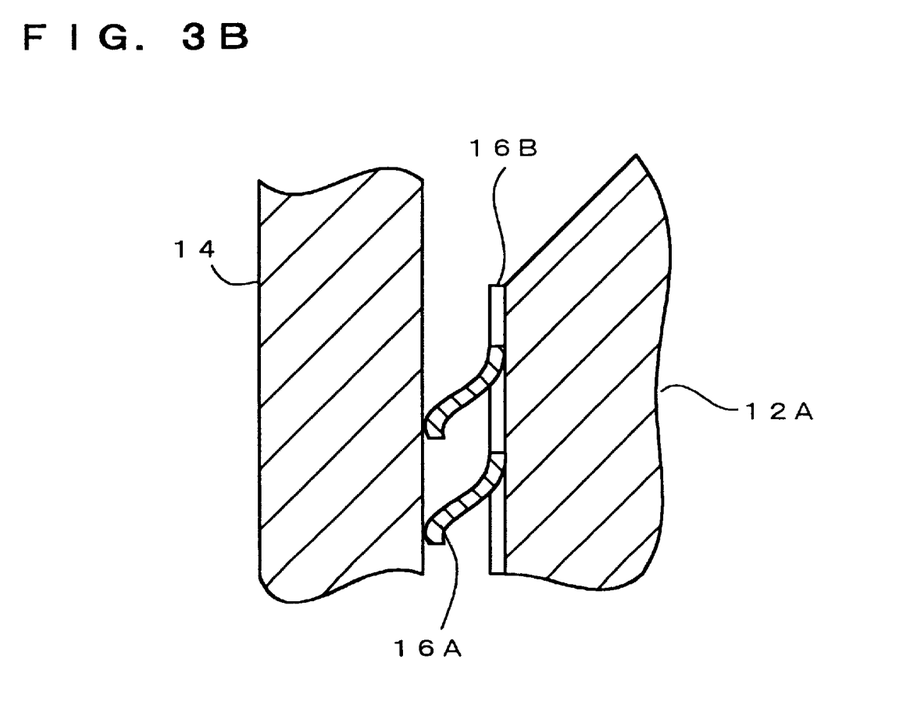
FIG. 3B is a cross sectional drawing illustrating the disk-shaped contact element of the switch of FIG. 1.

The first terminal C is attached to one end of the first fixed contact 19, and a cylindrical hole 19A is formed in the other end, extending in an axial direction of the piston 12A. The first fixed contact 19 is equipped with a cylindrical contact element 13, which is fastened to the inner surface of the first fixed contact 19 using miniature screws or an adhesive. As illustrated in FIGS. 2A and 2B, the contact element 13 is composed of a cylindrical base 13B formed of a thin metal plate, and a plurality of louvers 13A integral with the base 13B. The plurality of louvers 13A each have springiness, and extend parallel to the axis of the cylindrical base 13B. The hole 19A is made such a size that the piston rod 12B can slide when the louvers 13A of the contact element 13 are pressed against the piston rod 12B. The piston rod 12B sliding in the cylindrical hole 19A ensures the straightness of reciprocating movement of the movable contact 12. The top surface of piston 12A is equipped with a contact element 16 by a screw 16C. As illustrated in FIGS. 3A and 3B, the contact element 16 is comprised of a disc shaped base 16B made of a thin metal plate, and a plurality of louvers 16A integral with the base 16B. MULTILAM, being a registered trade mark of Multi-Contact AG of Switzerland, for example, is used as these contact elements 13 and 16 that reduce energy loss by increasing contact pressure. The second fixed contact 14 is fitted into the case 11 and has a planar surface extending parallel to and opposite to the top planar surface of the piston 12A. Part of the second fixed contact 14 extends to the outside of the case 11 water tightly blocking the opening 11C, and the second terminal T is attached to a tip end. Holes 11F and 11G for supplying air for driving the movable contact 12 to the hole 11A are formed in the case 11. A driver 15 connected to the holes 11F and 11G comprises an air pump 15A, a valve 15B responding to a signal from a controller 30, and a hose 15C, and causes the piston 12A to reciprocate inside the hole 11A. If the driver 15 supplies air at a fixed pressure to the hole 11G and the air is then expelled from the hole 11F, the top surface of the piston 12A is brought into contact with the planar surface of the second fixed contact 14 to electrically connect the first terminal C and the second terminal T. If the driver 15 supplies air at a fixed pressure to the hole 11F and the air is then expelled from the hole 11G, the top surface of the piston 12A is separated from the second fixed contact 14 to electrically disconnect the terminal C and the terminal T. In the case that insulating hydraulic fluid is used instead of air, a piston ring 12C is provided around the circumference of the piston 12A.

Figure 4:
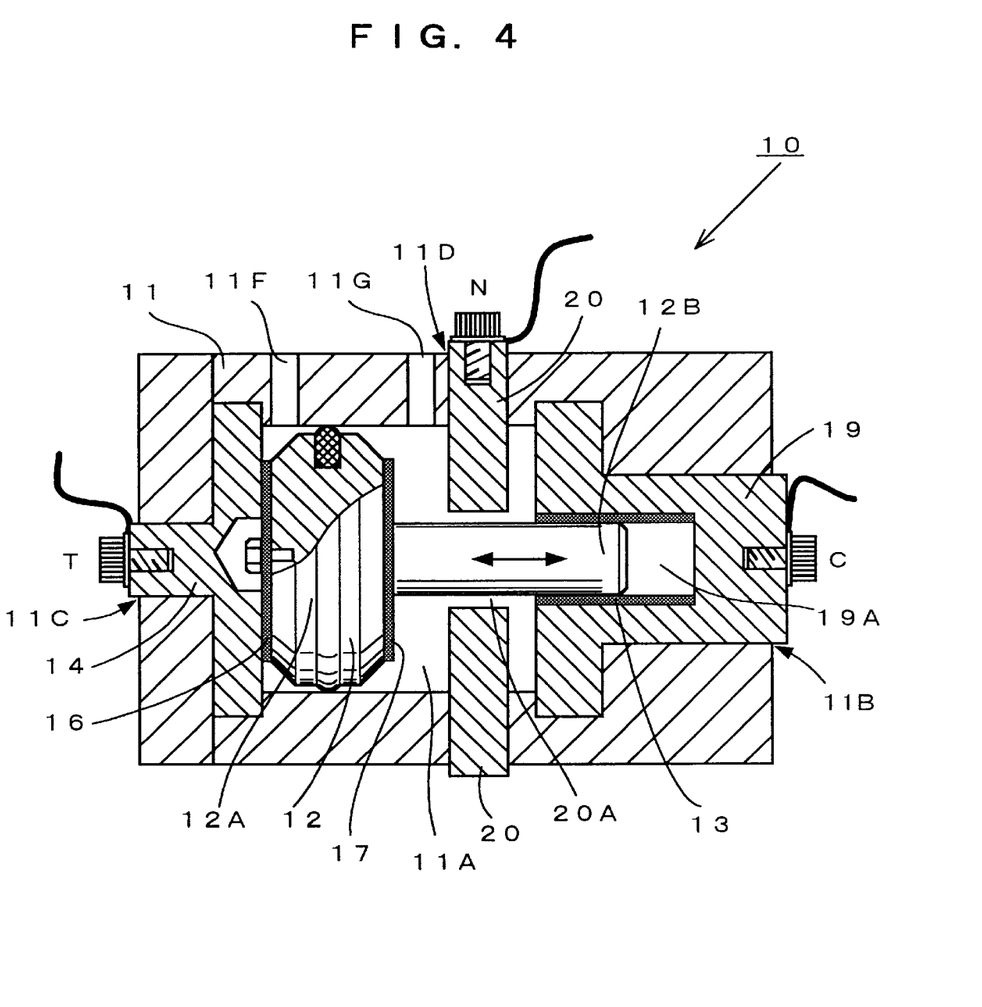
FIG. 4 is a cross sectional drawing illustrating another switch of the present invention.

A second embodiment of a switch for an electric discharge power supply circuit of the present invention will be described with reference to FIG. 4. In FIG. 4, similar elements are labelled with similar reference numerals as used in FIG. 1.

The switch 10 of FIG. 4 comprises a third fixed contact 20 fitted into a slot 11D formed in a wall surface of the case 11, and a third terminal N. The bottom surface of piston 12A is equipped with another contact element 17. The plate-shaped fixed contact 20 pierces through the slot 11D in a water tight manner and extends inside the case 11. The third fixed contact 20 has a hole 20A, through which the piston rod 12B passes, and a planar surface extending parallel to and opposite to the planar bottom surface of the piston 12A. The third terminal N is attached to the third fixed contact 20 at the outside of the case 11. The shape and positioning of the louvers of disc-shaped contact element 17 are the same as the contact element 16, and a hole is provided in the middle through which the piston rod 12B passes. If air is supplied to the hole 11F and expelled from the hole 11G, the top surface of the piston 12A is separated from the second fixed contact 14, and the bottom surface of the piston 12A is brought into contact with the planar surface of the third fixed contact 20 to electrically connect the terminal C and the terminal N.

Figure 5:
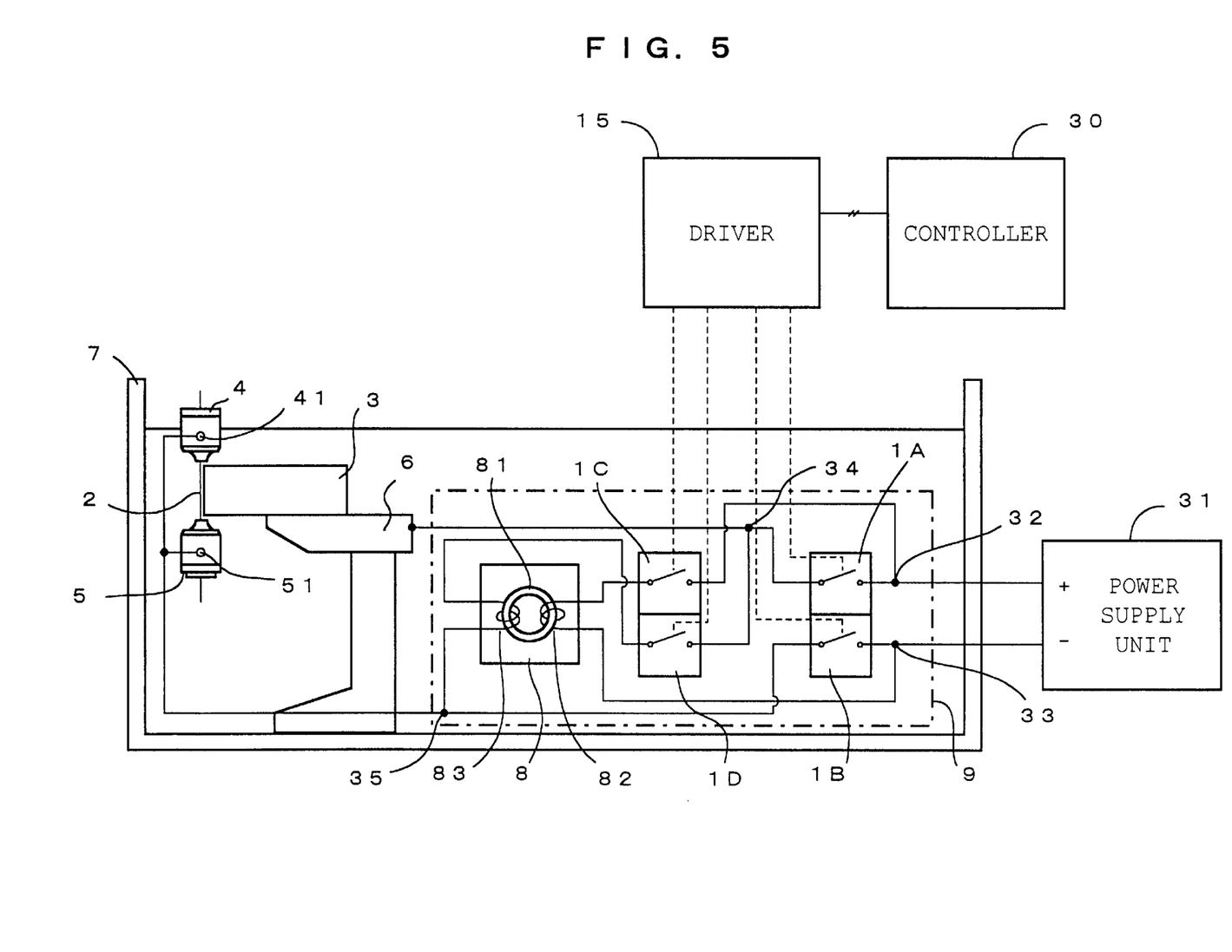
FIG. 5 is a drawing illustrating an electric discharge power supply circuit that uses the switch of FIG. 1.

An electric discharge power supply circuit using the switch 1 of FIG. 1 will now be described with reference to FIG. 5.

A workpiece 3 is fixed to a conductive work stand 6, and a wire electrode 2 travels perpendicularly between a pair of wire guides 4 and 5. Power is supplied to the workpiece 3 through a terminal provided on the work stand 6. The pair of wire guides 4 and 5 include power-feed contacts 41 and 51 for feeding power to the travelling wire electrode 2. In this drawing, the workpiece 3 is immersed inside a work tank 7 filled with dielectric fluid. A box 9 containing four switches 1A, 1B, 1C and 1D the same as the switch 1 and a transformer 8 is attached to a side wall or a bottom surface of the work tank 7. The transformer 8 comprises a ferrite ring core 81, a primary winding 82 and a secondary winding 83, and converts high frequency d.c. power pulses supplied from the power supply unit 31 into high frequency a.c. power. The driver 15 drives the switches 1A, 1B, 1C and 1D in response to a signal from the controller 30 so that high frequency d.c. power or high frequency a.c. power is selectively supplied between the wire electrode 2 and the workpiece 3. The switch 1A is provided between lines connecting a positive side of the power supply unit 31 to the workpiece 3. The switch 1B is provided between lines connecting a negative side of the power supply unit 31 to the wire electrode 2. The primary winding 82 is connected across a node 32 formed between the positive side of the power supply unit 31 and the switch 1A, and a node 33 formed between the negative side of the power supply unit 31 and the switch 1B. The switch 1C is provided between the node 32 and the primary winding 82. The secondary winding 83 is connected across a node 34 formed between the switch 1A and the workpiece 3, and a node 35 formed between the switch 1B and the wire electrode 2. The switch 1D is provided between the node 34 and the secondary winding 83. When the switches 1A and 1B are off and the switches 1C and 1D are on, the transformer 8 is connected to the electric discharge power supply circuit. On the other hand, when the switches 1A and 1B are on and the switches 1C and 1D are off, the transformer 8 is disconnected from the electric discharge power supply circuit.

Figure 6:
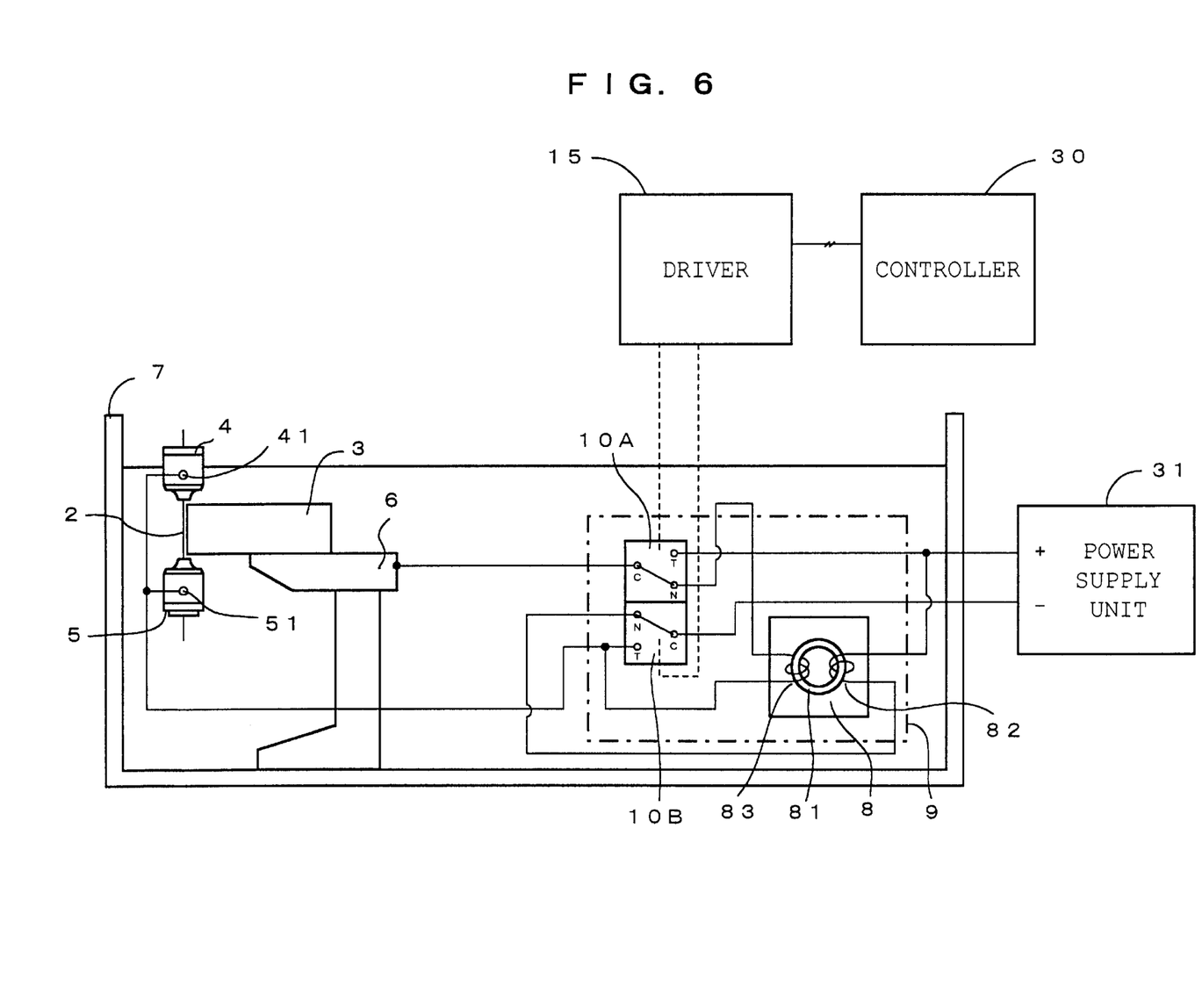
FIG. 6 is a drawing illustrating an electric discharge power supply circuit that uses the switch of FIG. 4.

An electric discharge power supply circuit using the switch 10 of FIG. 4 will now be described with reference to FIG. 6. In FIG. 6, similar elements are labelled with similar reference numerals as used in FIG. 5.

The switches 10A and 10B have the same structure as switch 10. The switch 10A is connected to the workpiece 3 through its first terminal C, connected to a positive side of the power supply unit 31 through its second terminal T, and connected to the secondary winding 83 through its third terminal N. The switch 10B is connected to a positive side of the power supply unit 31 through its first terminal C, connected to the wire electrode 2 through its second terminal T, and connected to the primary winding 82 through its third terminal N. When the C terminals of the switches 10A and 10B are respectively connected to the N terminals, the transformer 8 is connected to the electric discharge power supply circuit. On the other hand, when the C terminals are connected to the T terminals, the transformer 8 is disconnected from the electric discharge power supply circuit.

Figure 7:
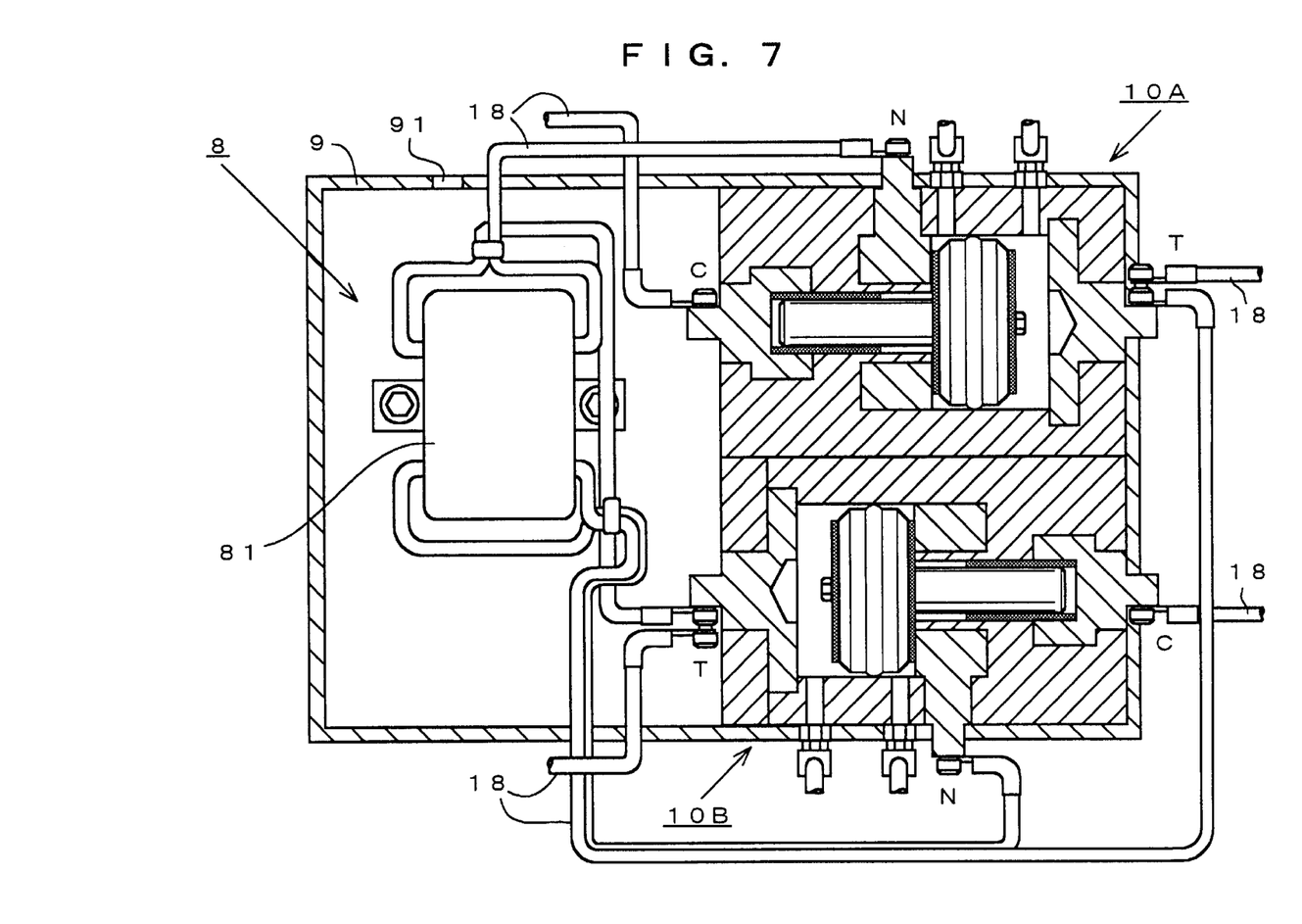
FIG. 7 is a cross sectional drawing illustrating the arrangement of two switches within the box of FIG. 6.

FIG. 7 shows an example of an arrangement where the switch 10A, switch 10B and transformer 8 are housed in a box 9. A ferrite ring core 81 is fastened to a side wall of the box 9. A hole 91 for introducing dielectric fluid into the box 9 in order to cool the ferrite ring core 81 is formed in the wall of the box 9. Reference numerals 18 represent insulated wires. Referring to FIGS. 5, 6 and 7, it will be understood by the artisan that the switch 10 makes the box 9 compact and contributes to a simplification in wiring.

The foregoing description of a preferred embodiment of the inventions has been presented for the purposes of illustration and description. It is not intended to be exhaustive or to limit the invention to the exact form disclosed, and obviously many modifications and variations are possible in light of the above teaching. It is intended that the scope of the invention be defined by attached claims.

What is claimed is:

1. A switch for changing a connection between an electric discharge power supply circuit and a machining gap formed between a tool electrode and a workpiece, comprising:

a movable contact having a piston and a piston rod attached to a first surface of the piston;

a housing having a cylindrical hole, said piston being positioned for reciprocal movement in said cylindrical hole;

a first fixed contact fitted to the housing in a generally water-tight relationship, said first fixed contact having a hole through which the piston rod is adapted to slide;

a second fixed contact fitted to the housing in a generally water-tight relationship, said second fixed contact having a planar surface extending parallel to and opposite to a second planar surface of the piston;

a first terminal attached to the first fixed contact and at least partially exposed to the exterior of the housing;

a second terminal attached to the second fixed contact and at least partially exposed to the exterior of the housing;

a driver for moving the movable contact to selectively contact the second fixed contact; and a third fixed contact fitted to the housing in a generally water-tight relationship and having a planar surface extending generally parallel to and opposite to the first planar surface of the piston, and a third terminal attached to the third fixed contact, said third terminal being at least partially exposed to the exterior of the housing.

2. The switch according to claim 1 wherein said third fixed contact includes a spring contact member on said planar surface.

3. The switch according to claim 1 wherein said driver is a pnematic driver.

4. The switch according to claim 1 wherein said driver is a hydraulic driver.

5. The switch according to claim 1 wherein the hole in the first fixed contact comprises a blind hole.

6. The switch according to claim 5 further comprising a spring contact fitted into with said hole to contact the piston rod.

7. The switch according to claim 6 wherein said spring contact comprises an annular sleeve having at least two axial louvers circumferentically disposed thereabout.

8. The switch according to claim 1 wherein said piston includes a piston ring for sealingly engaging with said cylindrical hole.

* * * * *